United States Patent [19]

Karube

[11] Patent Number: 4,984,245

[45] Date of Patent: Jan. 8, 1991

[54] LASER OSCILLATOR DEVICE AND METHOD OF FILLING LASER GAS IN SUCH LASER OSCILLATOR DEVICE

[75] Inventor: Norio Karube, Machida, Japan

[73] Assignee: Fanuc, Ltd., Yamanashi, Japan

[21] Appl. No.: 517,516

[22] Filed: Apr. 30, 1990

Related U.S. Application Data

[63] Continuation of Ser. No. 296,058, filed as PCT JP88/00466 on May 17, 1988, published as WO88/09579 on Dec. 1, 1988, abandoned.

[30] Foreign Application Priority Data

May 18, 1987 [JP] Japan .................. 62-120904

[51] Int. Cl.$^5$ ........................ H01S 3/22
[52] U.S. Cl. .......................... 372/59
[58] Field of Search ................. 372/55, 58, 59

[56] References Cited

U.S. PATENT DOCUMENTS

| | | | |
|---|---|---|---|
| 3,789,320 | 1/1974 | Hepburn | 372/58 |
| 3,891,944 | 6/1975 | Lavanni et al. | 372/58 |
| 4,056,789 | 11/1977 | Stregack et al. | 372/58 |
| 4,206,429 | 6/1980 | Pinsley | 327/58 |
| 4,417,340 | 11/1983 | Horiuchi et al. | 372/58 |
| 4,610,014 | 9/1986 | Martinen et al. | 372/59 |
| 4,672,620 | 6/1987 | Slusher et al. | 372/58 |

FOREIGN PATENT DOCUMENTS

| | | | |
|---|---|---|---|
| 63-48880 | 8/1986 | Japan | 372/59 |
| 63-42189 | 10/1986 | Japan | 372/59 |

Primary Examiner—Léon Scott, Jr.
Attorney, Agent, or Firm—Staas & Halsey

[57] ABSTRACT

A laser oscillator device effects laser oscillation while circulating a laser gas with a rotary blower (6). The laser oscillator device has a fresh gas passage (16) separate from a passsage of the laser gas and having filters (9a, 9b), and ejector holes (17a, 17b) defined in said passage of the laser gas near optical components (2, 3) for ejecting a gas into the passage of the laser gas which is circulated by the blower, the fresh gas passage (16) being connected to the ejector holes (17a, 17b). A fresh laser gas from which impurities have been removed by filters (9a, 9b) flows from the ejector holes (17a, 17b) away from the optical components (2, 3) to prevent the optical components from being contaminated by impurities in the laser gas which would otherwise be diffused into the optical components.

8 Claims, 5 Drawing Sheets

LASER OSCILLATOR DEVICE AND METHOD OF FILLING LASER GAS IN SUCH LASER OSCILLATOR DEVICE

This is a continuation of copending application Ser. No. 296,058, filed as PCT JP88/00466 on May. 17, 1988, published as WO88/09579 on Dec. 1, 1988, now abandoned.

BACKGROUND OF THE INVENTION

1. Field of the Invention

The present invention relates to a laser oscillator device for producing a high-power laser beam for cutting workpieces of metal or the like, and more particularly to a laser oscillator device arranged to prevent contamination of optical components of an axial-flow $CO_2$ laser.

2. Description of the Related Arts

Axial-flow $CO_2$, lasers are widely used as small-size high-power lasers for cutting workpieces of meta or the like. The axial-flow $CO_2$, laser employs a Roots blower for circulating a laser gas at a high speed of about 100 m/sec in a laser tube, so that the laser power will be increased to a range from 500 to 1000 W per meter of the laser tube.

FIG. 4 of the accompanying drawings illustrates a conventional axial-flow $CO_2$ laser which has a discharge tube 1, a total reflection mirror 2, and an output coupling mirror 3. A laser gas is forced to flow through the discharge tube 1 by a Roots blower 6. The laser gas as it flows out of the discharge tube 1 is cooled by a cooling unit 7. Electrodes 5a, 5b are disposed in intimate contact with the outer surface of the discharge tube 1. A high-frequency voltage which is high enough to cause electron capture is applied to the electrodes 5a, 5b by a pumping power supply 4 to generate a stable discharge in the discharge tube 1 to emit a laser beam 8.

Major problems of the conventional axial-flow $CO_2$ laser are contamination of the optical components (i.e., the total reflection mirror 2 and the output coupling mirror 3) and reductions in the laser oscillation characteristics caused by such contamination, i.e., a laser power reduction and a mode deterioration. When the contaminated optical components are removed and observed in detail, it can be seen that the surfaces of evaporated films on the optical components are deteriorated. The laser power reduction is mainly caused by a reduction in the reflectivity of the total reflection mirror 2. It has been confirmed through experimentation and various calculations that when the reflectivity of the total reflection mirror in a 1KW $CO_2$ laser with two folded beam paths is reduced by 1%, the laser power is reduced by about 10%. The mode deterioration results from an optical distortion of the output coupling mirror 3, and is particularly large when the output coupling mirror 3 is made of ZnSe. The mode deterioration is caused by heat produced by absorption of the laser beam by impurities deposited on the surface of the output coupling mirror 3.

The impurities which contaminate the optical components (i.e., the total reflection mirror 2 and the output coupling mirror 3) have been analyzed. FIG. 5 of the accompanying drawings shows a spectrum of infrared radiation absorption by the contaminated total reflection mirror 2. The horizontal axis of the graph of FIG. 5 represents a wave number, i.e., the number of waves per cm. The wavelength becomes longer to the right along the horizontal axis. The vertical axis of the graph indicates the transmittance of infrared radiation, the transmittance being represented by %. The lower the transmittance, the greater the absorption. A study of FIG. 5 shows that the infrared radiation is absorbed by $CH_2$, $CH_3$ in a range from 2850 to 2950 $cm^{-1}$, by $CH_2$, CH near 1460 $cm^{-1}$, and by $CH_3$, near 1370 $cm^{-1}$. These impurities come from the oil refined from petroleum and used as gear oil in the Roots blower 6. The infrared radiation is also absorbed by Si—O—Si in a range from 1000 to 1200 $cm^{-1}$, Si—O—Si being originated from silicone grease used as bearing grease in the Roots blower 6. The infrared radiation is also absorbed by an OH radical near 3320 $cm^{-1}$. Though the OH radical cannot be found in new oil, it can always be observed in the old laser gas. C=O which absorbs the infrared radiation in a range from 1700 to 1750 $cm^{-1}$ results from an oil component which has been oxidized by exposure to the laser beam. These oil components are not uniformly deposited on the entire surfaces of the optical components, but are scattered in an island pattern according to a microscopic observation. The Roots blower 6 is of such a structure that when oil components enter the impeller housing of the Roots blower 6, they are introduced into the laser gas. These oil components go, together with the laser gas, into all parts of the laser oscillator device, and cause the above problems especially when deposited on the optical components.

SUMMARY OF THE INVENTION

It is an object of the present invention to provide a laser oscillator device which will solve the aforesaid problems and which will prevent optical components of an axial-flow $CO^2$ laser from being contaminated.

To solve the above problems, according to a first invention, as shown in FIG. 1, there is provided a laser oscillator device for effecting laser oscillation while circulating a laser gas with a rotary blower (6), comprising:

a fresh gas passage (16) separate from a passage of the laser gas and having filters (9a, 9b), and ejector holes (17a, 17b) defined in said passage of the laser gas near optical components (2, 3) for ejecting a gas into the passage of the laser gas which is circulated by said blower;

said fresh gas passage (16) being connected to said ejector holes (17a, 17b); and the arrangement being such that a fresh laser gas from which impurities have been removed by filters (9a, 9b) flows from the ejector holes (17a, 17b) away from the optical components (2, 3).

According to a second invention, as shown in FIG. 1, there is provided a method of filling a laser gas in a laser oscillator device for effecting laser oscillation while circulating a laser gas with a rotary blower (6), comprising the steps of:

providing a fresh gas passage (16) separate from a passage of the laser gas and having filters (9a, 9b), and ejector holes (17a, 17b) defined in said passage of the laser gas near optical components (2, 3) for ejecting a gas into the passage of the laser gas which is circulated by said blower;

connecting said fresh gas passage (16) to said ejector holes (17a, 17b);

allowing a fresh laser gas from which impurities have been removed by filters (9a, 9b) to flow from the ejector holes (17a, 17b) away from the optical components (2, 3); and filling the laser gas only from said ejector holes (17a, 17b).

With the first invention, a fresh gas from which impurities have been removed by the filters is ejected through the ejector holes in directions away from the optical components. Therefore, the optical components are prevented from being contaminated by impurities in the laser gas which would otherwise be diffused onto the optical components.

With the second invention, a fresh gas from which impurities have been removed by the filters is filled in the device only through the ejector holes in directions away from the optical components. Thus, the optical components are prevented from being contaminated by dust which has been deposited on the wall of the device.

DETAILED DESCRIPTION OF THE PREFERRED EMBODIMENTS

Embodiments of the present invention will hereinafter be described in specific detail with reference to the drawings.

Figure 1:
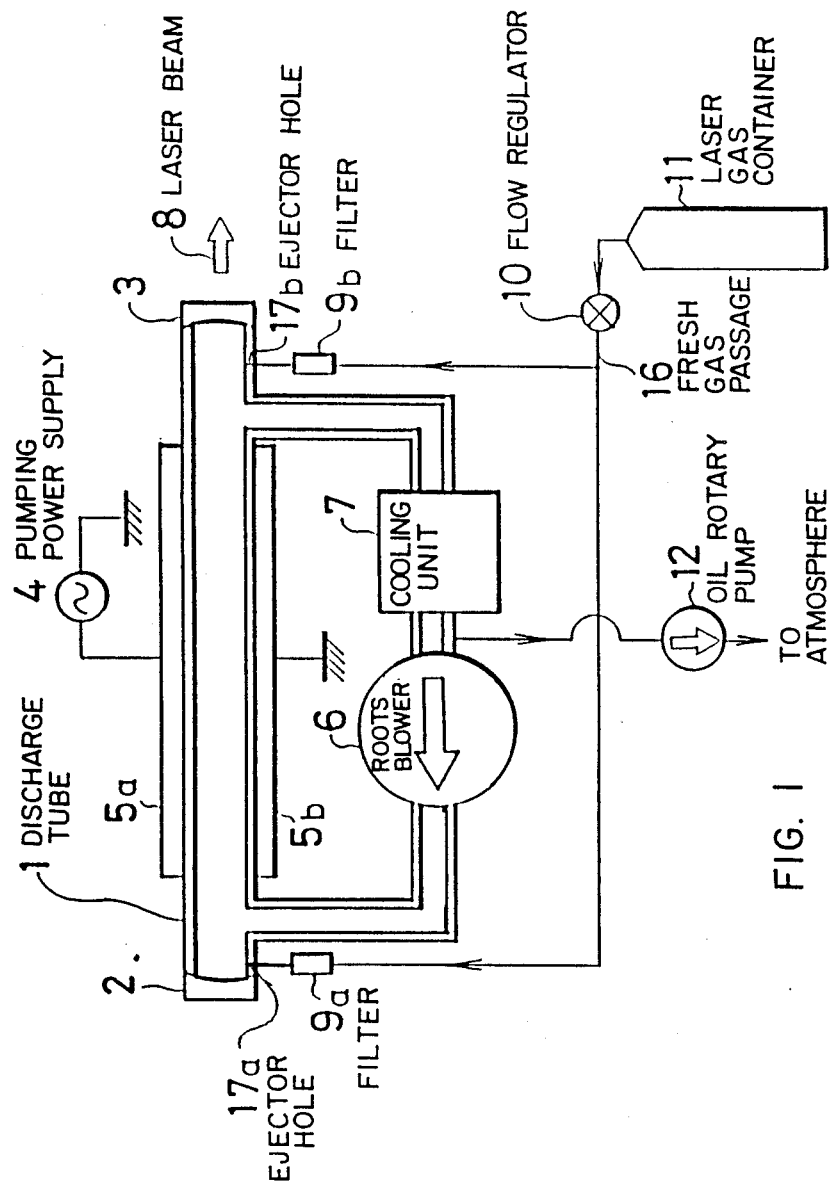
FIG. 1 is a schematic diagram of a first embodiment of the present invention.
Figure 4:
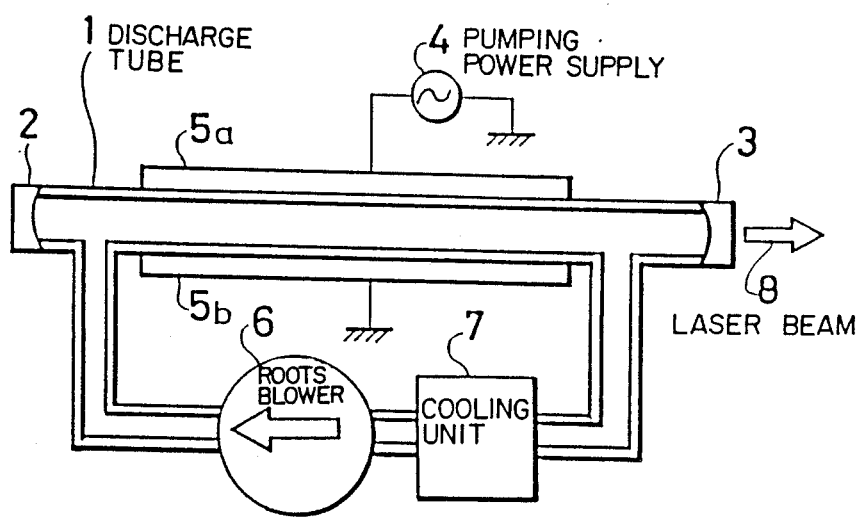
FIG. 4 is a schematic diagram of a conventional laser oscillator device.
Figure 5:
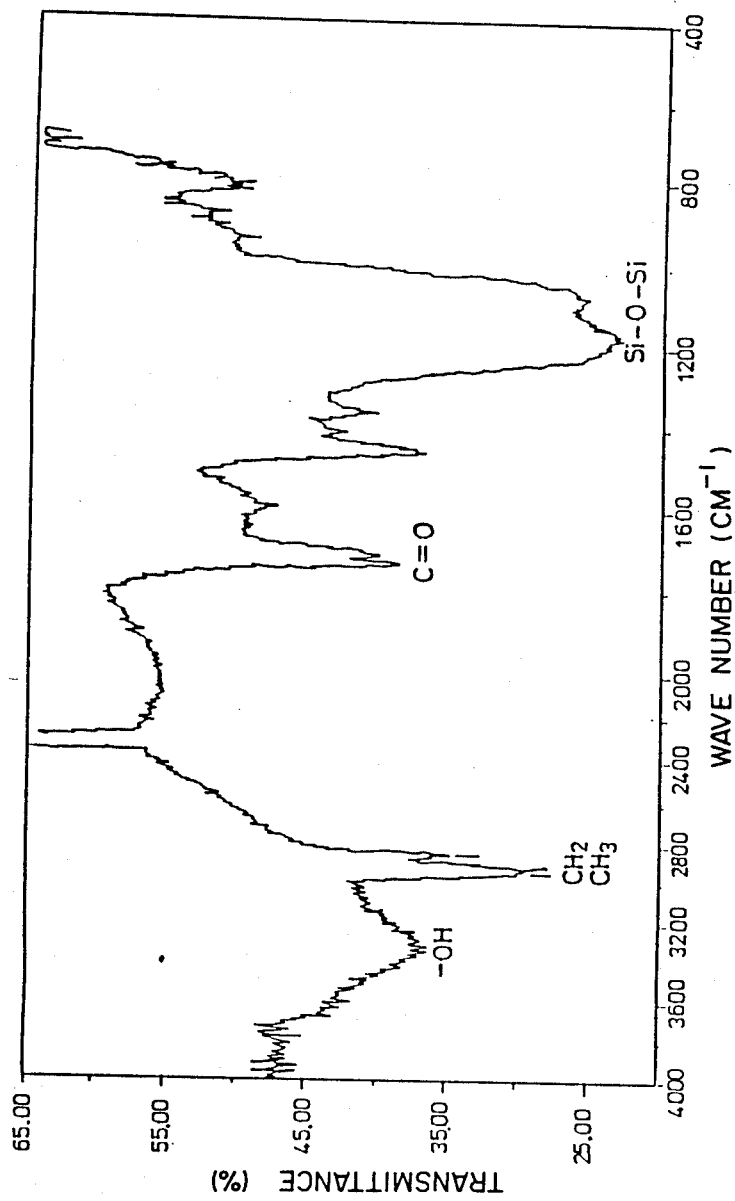
FIG. 5 is a graph showing a spectrum of infrared radiation absorbed by a contaminated total reflection mirror.

FIG. 1 is a block diagram of a first embodiment of the present invention. Those parts in FIG. 1 which are identical to those of FIG. 4 are denoted at identical reference characters. An axial-flow $CO_2$ laser has a discharge tube 1, a total reflection mirror 2, and an output coupling mirror 3. A laser gas is caused to flow through the discharge tube 1 by a Roots blower 6. The laser gas as it flows out of the discharge tube 1 is cooled by a cooling unit 7. Electrodes 5a, 5b are disposed in intimate contact with the outer surface of the discharge tube 1. A high-frequency voltage which is high enough to cause electron capture is applied to the electrodes 5a, 5b by a power supply 4 to generate a stable discharge in the discharge tube 1 to emit a laser beam 8.

A fresh gas is supplied from a laser gas container 11 and flows a passage 16. The laser gas container 11 serves to compensate for a reduction in a laser gas which is caused by discharging the laser gas. A flow regulator 10 is disposed in the passage 16 for regulating the supply of the fresh gas. After impurities are removed from the fresh gas by filters 9a, 9b, the fresh gas is ejected into the discharge tube 1 through ejector holes 17a, 17b. Therefore, oil components in the laser gas are prevented from reaching the total reflection mirror 2 or the output coupling mirror 3 and hence from contaminating these optical components. The laser gas is partly discharged into atmosphere by an oil rotary pump 12.

A 1 KW $CO_2$ laser requires to be supplied with 600 liters/min. of a laser gas circulated by the roots blower 6. In the above embodiment, good results can be obtained by supplying a fresh laser gas from the laser gas container 11 at a ratio of about 1/30 of the circulating laser gas, i.e., about 20 liters/min.

Figure 2:
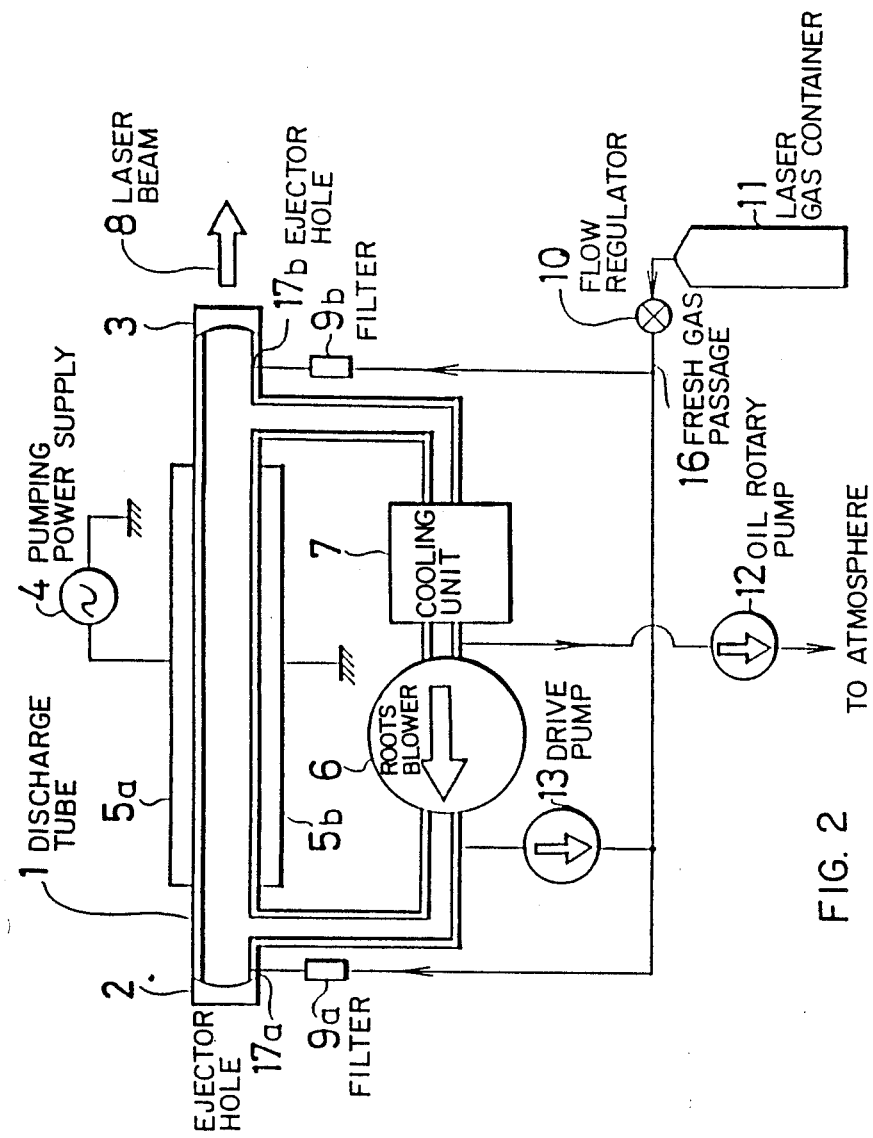
FIG. 2 is a schematic diagram of a second embodiment of the present invention.

FIG. 2 is a block diagram of a second embodiment of the present invention. Those parts shown in FIG. 2 which are identical to those of FIG. 1 are denoted at identical reference characters, and will not be described in detail. The embodiment of FIG. 2 differs from the embodiment of FIG. 1 in that a fresh gas is supplied not only from a laser gas container 11 but also from the outlet of a Roots blower 6 through a dry pump 13. With this arrangement, it is possible to reduce the amount of a fresh laser gas supplied from the laser gas container 11 to about 10 liters/min. The amount by which a fresh laser gas is consumed may further be reduced dependent on laser power output conditions and by improving the Roots blower 6.

The drive pump 13 can pressurize the laser gas without bringing the same into contact with oil, and should preferably be a diaphragm pump. Since any diaphragm pump which can apply a laser gas pressure of 100 Torr or below and has a sufficient displacement is expensive, and also since the pressure at the inlet of the diaphragm pump should preferably be high, the diaphragm pump draws the laser gas from the outlet of the Roots blower 6. Impurities are removed from the laser gas supplied from the Roots blower 6 by filters 9a, 9b.

Figure 3:
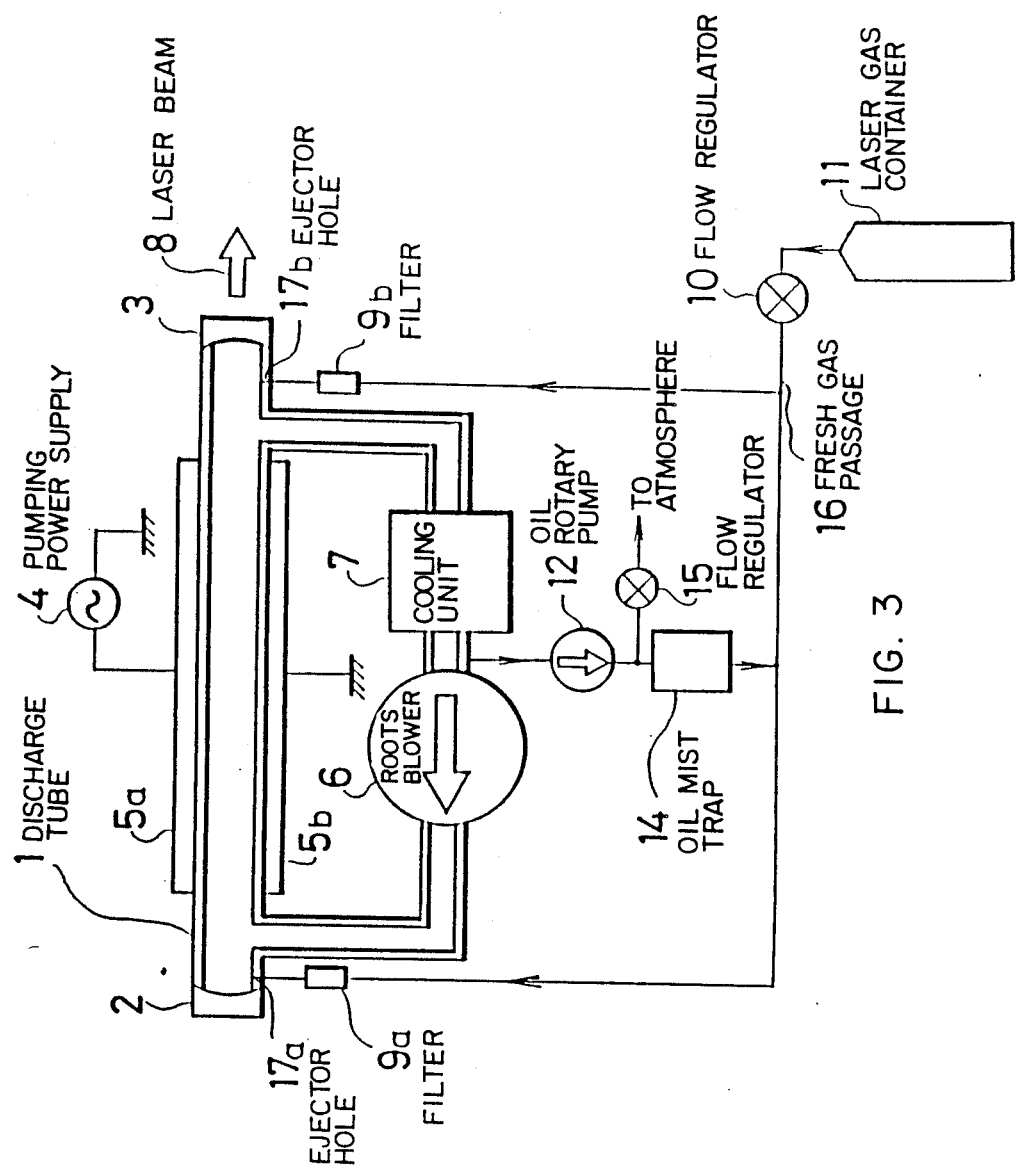
FIG. 3 is a schematic diagram of a third embodiment of the present invention.

FIG. 3 is a block diagram of a third embodiment of the present invention. Those parts in FIG. 3 which are identical to those of FIG. 1 are denoted at identical reference characters, and will not be described in detail. The embodiment of FIG. 3 differs from the embodiment of FIG. 1 in that a fresh gas is supplied not only from a laser gas container 11, but also from the outlet of a Roots blower 6 through an oil rotary pump 12 and an oil mist trap 14. More specifically, the output gas from the oil rotary pump 12 is divided into two gas flows, one of which is drained into atmosphere through a flow regulator 15. The other gas flow is passed through the oil mist trap 14 by which oil components are removed from the gas flow. The gas from the oil mist trap 14 is then mixed with the fresh gas supplied from the laser gas container 11, and the mixture gas is fed as a gas for protecting the optical components into the discharge tube 1 through filters 9a, 9b. Since the oil rotary pump 12 may employ an ordinary oil rotary pump, it can easily be selected which is operable under the laser gas pressure. Inasmuch as the oil rotary pump 12 doubles as an evacuating pump, it is economically advantageous. A pump separate from an evacuating pump may be used to regulate the amount of supply of the laser gas. According to the third embodiment, the amount of supply of a fresh gas from the laser gas container 11 can be reduced to about 1 liter/min.

Filling a gas initially, not during operation of the laser oscillator device, will be described below. When a gas is filled under a constant pressure into the device after air has been discharged, the gas flows into the device at a speed close to the speed of motion of molecules. At this time, the gas entrains dust attached to the wall of the device. If the gas is directed toward the optical components 2, 3, contamination of the optical components 2, 3 cannot be avoided. To prevent such contamination in the device shown in each of FIGS. 1, 2, and 3, the laser gas is ejected into the discharge tube only from the ejector holes 17a, 17b.

While the laser oscillator device is in operation, the laser gas is circulated by the Roots blower 6 as described above with reference to the first through third embodiments. Since no gas flow is present but a gas remains stagnant in the vicinity of the optical components 2, 3, the ejection of a fresh gas only in such an amount to prevent diffusion-based contamination is sufficient.

The above embodiments employ different amounts of a fresh gas from the laser gas container and different numbers of pumps. The amount of a supplied fresh gas and the number of pumps used are determined dependent on the output capacity of the laser oscillator device in actual use, the service life and reliability of the optical components, the pumps which are available, the allowable amount of a fresh gas, and other conditions.

According to the first invention, as described above, a fresh gas from which impurities have been removed by the filters is ejected through the ejector holes in directions away from the optical components. Therefore, the optical components are prevented from being contaminated by impurities in the laser gas which would otherwise be diffused into the optical components.

According to the second embodiment, after air has been discharged from the laser oscillator device, a laser gas is filled in the device only through the holes for ejecting a fresh gas into the discharge tube. Thus, the optical components are prevented from being contaminated by dust which has been deposited on the wall of the device.

I claim:

1. A method of filling a laser gas in a laser oscillator device for effecting laser oscillation while circulating a laser gas with a rotary blower, comprising the steps of:
   providing a fresh gas passage separate from a passage of the laser gas and having filters,
   providing ejector holes defined in said passage of the laser gas near optical components for ejecting a gas into the passage of the laser gas which is circulated by said blower;
   connecting said fresh gas passage to said ejector holes;
   removing circulated laser gas from downstream of the rotary blower and adding it to the fresh gas passage upstream of the filters; and
   allowing a mixture of fresh laser gas circulated laser gas from which impurities have been removed by the filters to flow from the ejector holes away from the optical components.

2. A laser oscillator device, comprising:
   a discharge tube having two opposite axial ends, an inlet and an outlet for circulating a laser gas therethrough;
   a total reflection mirror and an output coupling mirror installed at the opposite ends of the discharge tube;
   a blower disposed in a first passage connecting the inlet and outlet for circulating the laser gas axially through the discharge tube;
   a laser gas container containing a supply of fresh laser gas;
   ejector holes installed at both ends of said discharge tube near said total reflection mirror and said output coupling mirror
   a second passage communicating fresh gas from the laser gas container to the ejector holes;
   filters disposed in said second passage; and
   a dry pump disposed in a line connecting the first and second passages, the line being coupled to the first passage downstream of the blower and to the second passage upstream of the filters, the dry pump delivering a mixture of fresh gas from the laser gas supply and circulated laser gas from the first passage to the ejector holes.

3. A laser oscillator device according to claim 2, wherein said first passage is provided with a means for supplying part of the laser gas exhausted from an outlet of said blower to said second passage.

4. A laser oscillator device according to claim 2, wherein said exhaust means is provided with means for supplying part of the laser gas exhausted from said exhaust means to said second passage through an oil-mist trap.

5. A laser oscillator device for effecting laser oscillation while circulating a laser gas with a rotary blower, comprising:
   a discharge tube having opposite axial ends, and optical components disposed at the opposite axial ends;
   a primary laser gas passage for circulating laser gas in the discharge tube;
   a supply of fresh gas;
   a fresh gas passage connected to the fresh gas supply and being separate from the primary laser gas passage and having filters for removing impurities from the fresh gas;
   ejector holes defined in said fresh gas passage near the optical components for ejecting the fresh filtered gas into the discharge tube which is circulated by said blower;
   said fresh gas passage being connected to said ejector holes;
   wherein a fresh laser gas from which impurities have been removed by filters flows from the ejector holes away from the optical components, and
   wherein said fresh gas is a mixture of a portion of the circulated laser gas fed feom said blower and pressurized by a dry pump, and a laser gas supplied from a laser gas container.

6. A laser oscillator device for effecting laser oscillation while circulating a laser gas with a rotary blower, comprising:
   a discharge tube having opposite axial ends, and optical components disposed at the opposite axial ends;
   a primary laser gas passage for circulating laser gas in the discharge tube;
   a supply of fresh gas;
   a fresh gas passage connected to the fresh gas supply and being separate from the primary laser gas passage and having filters for removing impurities from the fresh gas;
   ejector holes defined in said fresh gas passage near the optical components for ejecting the fresh filtered gas into the discharge tube which is circulated by said blower;
   said fresh gas passage being connected to said ejector holes;
   wherein a fresh laser gas from which impurities have been removed by filters flows from the ejector holes away from the optical components, and
   wherein said fresh gas is a mixture of a portion of the circulated laser gas fed from said blower and pressurized by an oil rotary pump, and passed through an oil mist trap by which oil mist has been removed, and a laser gas supplied from a laser gas container.

7. A laser oscillator device according to claim 6, wherein said oil rotary pump doubles as a pump for evacuating the laser oscillator device.

8. A laser oscillator device according to claim 6, wherein said oil rotary pump is separate from a pump for evacuating the laser oscillator device.

* * * * *